United States Patent [19]

Nagae et al.

[11] Patent Number: 4,641,924

[45] Date of Patent: Feb. 10, 1987

[54] LIQUID CRYSTAL DEVICE

[75] Inventors: Yoshiharu Nagae; Shunichi Numata; Noriyuki Kinjo; Katuyuki Funahata, all of Hitachi, Japan

[73] Assignee: Hitachi, Ltd., Tokyo, Japan

[21] Appl. No.: 696,908

[22] Filed: Jan. 31, 1985

[30] Foreign Application Priority Data

Feb. 3, 1984 [JP] Japan ................... 59-17052

[51] Int. Cl.[4] ................................. G02F 1/13
[52] U.S. Cl. ................................. 350/339 R
[58] Field of Search ............ 219/203; 350/339 R, 350/332, 336, 344, 351

[56] References Cited

U.S. PATENT DOCUMENTS

| 4,073,986 | 2/1978 | Keslar et al. | 219/203 X |
| 4,256,382 | 3/1981 | Piliavin et al. | 350/344 X |
| 4,464,020 | 8/1984 | Le Berre et al. | 350/351 X |

FOREIGN PATENT DOCUMENTS

| 30859 | 3/1979 | Japan | 350/339 R |
| 157645 | 12/1979 | Japan | 350/339 R |
| 114930 | 9/1981 | Japan | 350/339 R |

Primary Examiner—Donald A. Griffin
Attorney, Agent, or Firm—Antonelli, Terry & Wands

[57] ABSTRACT

A liquid crystal device comprising a thermal writing type liquid crystal, an electrode for generating heat necessary for said thermal writing, and a support for supporting said liquid crystal and said electrode, wherein a material having a coefficient of thermal expansion lying between the coefficient of thermal expansion of said electrode and that of said support is arranged between said electrode and said support, whereby said electrode for generating heat can be prevented from being degraded by failure or peeling from the support due to thermal stress.

15 Claims, 5 Drawing Figures

LIQUID CRYSTAL DEVICE

BACKGROUND OF THE INVENTION

This invention relates to a liquid crystal device and more particularly relates to a liquid crystal device which is suited for manufacturing a thermal writing type liquid crystal device having a prolonged service life.

Liquid crystal devices wherein a thermo-optic effect of a liquid crystal having a smectic phase is utilized, which are examples of thermal writing type liquid crystal devices, are described in detail in, for example, S. Lu et al. "Thermally-Addressed Pleochroic Dye Switching Liquid Crystal Display" (SID 82 DIGEST, pp. 238–239 (1982)), a paper by S. LeBerre et al. "A Flat Smectic Liquid Crystal Display" (SID 82 DIGEST, pp. 252–253), and U.S. patent application Ser. No. 521,900, now U.S. Pat. No. 4,548,474, issued Oct. 22, 1985.

FIG. 1 shows the basic structure of the liquid crystal device described in the above-cited paper. A liquid crystal 1 having a smectic phase is sandwiched between two glass substrates 2 and 3. The lower glass substrate 3 which serves as a support for both the liquid crystal and an electrode for generating heat is provided with a heat electrode 4 which is an electrode for generating heat. The upper substrate 2 is provided with a transparent electrode 5, and these two electrodes form an X-Y matrix structure.

Information can be written in a liquid crystal by energizing any heat electrode, heating the liquid crystal with generated Joule's heat, thereby allowing the liquid crystal to transfer into an isotropic phase or a nematic phase, and changing the state of orientation of the liquid crystal according to the presence or absence of an electric field applied to the liquid crystal during the course of its cooling.

Nevertheless, the temperature of the heat electrode itself is known to increase to about 100° to 150° C. to attain writing. Therefore, thermal expansion of the heat electrode itself must not be neglected.

In conventional liquid crystal device structures, the heat electrode has been formed by vacuum-depositing a metal such as Al directly on a glass substrate and etching the deposited film. Therefore, when the electrode is heated, a thermal stress is produced between the heat electrode and the glass substrate due to the difference between their coefficients of thermal expansion, so that the heat electrode fails or peels from the glass base, resulting in a decrease in the service life of the liquid crystal device.

SUMMARY OF THE INVENTION

It is an object of the present invention to provide a liquid crystal device having a structure suited to prevent an electrode for generating heat from being degraded by failure or peeling from the support due to thermal stress.

According to the present invention, a material having a coefficient of thermal expansion lying between the coefficient of the electrode and that of the support is arranged between said electrode and said support to eliminate a drawback that thermal stress results from the difference between the coefficient of thermal expansion of the electrode and that of the support and the electrode fails or peels from the support when the electrode generates heat in a liquid crystal device.

Other objects and features of the present invention will be obvious from the following description of embodiments.

DESCRIPTION OF THE PREFERRED EMBODIMENTS

The present invention will be described with reference to embodiments of liquid crystals having a smectic A phase.

Embodiment 1

Figure 1:
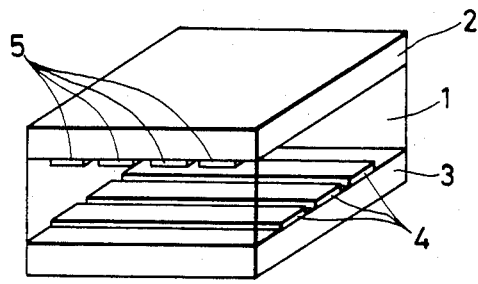
FIG. 1 is a perspective view of the basic structure of the display panel of a liquid crystal according to a prior art.
Figure 2:
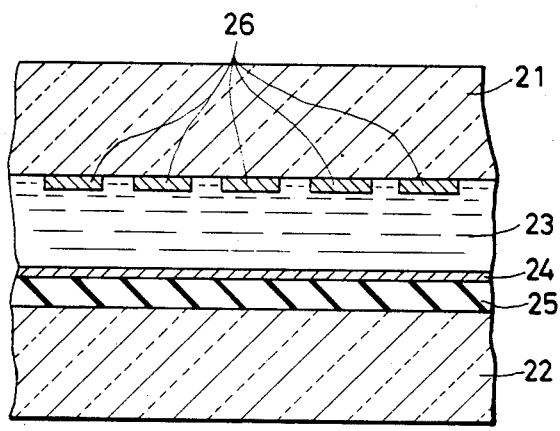
FIGS. 2 and 3 are drawings of the basic structure of the display panel of the liquid crystal device of Embodiment 1.
Figure 3:
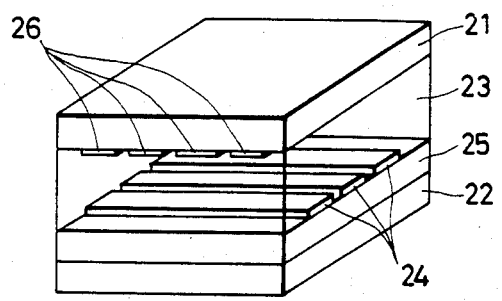

FIGS. 2 and 3 are the sectional and perspective views of the basic structure of the display panel of a liquid crystal device of Embodiment 1 of the present invention.

A glass substrate 21 is provided with a transparent electrode 26. The material of the transparent electrode 26 is a mixture of indium oxide and tin oxide. A glass substrate 22 which serves as a support for both a liquid crystal and the electrode for generating heat is provided with a heat electrode 24 which is an electrode for generating heat necessary for writing. The material of the heat electrode 24 is aluminum.

The material for the glass substrates 21 and 22 in this embodiment is borosilicate glass which has a composition of 81% of $SiO_2$, 12% of $B_2O_3$, 4% of $Na_2O$, and 3% of $Al_2O_3$.

In this embodiment, for the purpose of preventing the heat electrode 24 from failing or peeling from the glass substrate for supporting the heat electrode 24 by thermal stress which, when the heat electrode 24 is heated, results from the difference between the coefficient of thermal expansion of the glass substrate 22 and that of the heat electrode 24, a material having a coefficient of thermal expansion lying between the coefficient of thermal expansion of the heat electrode 24 and that of the glass substrate 22 is arranged as a layer 25 for thermal stress relaxation between the heat electrode 24 and the glass substrate 22.

In this embodiment, a polyimide having a chemical structural unit represented by the following formula [II].

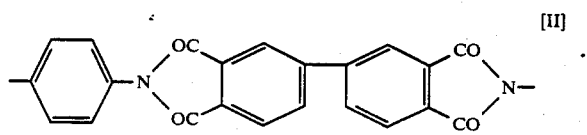

is used as the material for the layer 25 for thermal stress relaxation. This polyimide was prepared as follows.

40.31 g of p-phenylenediamine (p-PDA) was placed in a four-necked flask fitted with a thermometer, agitator, reflux condenser, and nitrogen gas inlet, and dissolved in 850 g of N-methyl-2-pyrrolidone (NMP). The four-necked flask was immersed in a water bath of 0° to 50° C., and 109.7 g of 3,3', 4,4'-tetracarboxybiphenyl dianhydride (BPDA) was added thereto, while the temperature was being controlled. The p-PDA and BPDA were used at a molar ratio of 1:1. After the BPDA has been dissolved, the water bath was removed, and the reaction was continued for about 5 hours at about room temperature to obtain a polyamic acid varnish. The desired polyimide could be obtained by heating this varnish. The preparation of the polyimide need not be carried out by using the above amounts of the chemicals, as long as the molar ratio of p-PDA to BPDA is 1:1.

The obtained polyamic acid varnish was applied to the glass substrate 22 and dried by heating to form a 10 μm-thick polyimide film as the layer 25 for thermal stress relaxation. Thereafter, the heat electrode 24 was formed on the layer 25 for thermal stress relaxation, which was then assembled with a glass substrate on which a transparent electrode 26 was formed. A liquid crystal 23 having a smectic phase was enclosed within this assemblage to form a liquid crystal device having a structure as shown in FIG. 3.

The liquid crystal material generally used in this embodiment is for example, a mixture of the compounds represented by

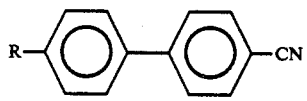

(wherein R is an alkyl group) which exhibits a positive dielectric anisotropy and a smectic phase at room temperature, and transfers from a smectic phase to a nematic phase at 42° C. and from the nematic phase to an isotropic liquid phase (Isotropic phase) at 45° C.

Examples of other liquid crystals exhibiting a smectic phase include a mixture of a 4,4'-alkoxybiphenylcarboxylic acid alkyl ester and a 4,4'-alkylcyanotolan, and a mixture of a 4-alkoxyphenyl 4'-alkylbenzoate and a p,p'-alkylcyanobiphenyl.

Description will now be made of a process for thermally writing information in a liquid crystal. When a liquid crystal having a smectic phase is heated by Joule's heat generated by passing an electric current through a heat electrode 24, the liquid crystal transfers through a nematic phase to an isotropic liquid phase (isotropic phase) and becomes substantially transparent. When the liquid crystal layer is cooled under application of a sufficient electric field in this state, the liquid crystal transfers through a nematic phase to a smectic phase and becomes substantially transparent persistently.

On the other hand, when the electric field applied to the liquid crystal layer by the heat electrode 24 and the transparent electrode 26 is set at zero or nearly zero, the molecules of the liquid crystal exhibit random orientation and, therefore, the liquid crystal layer assumes a smectic phase wherein scattering takes place to decrease the brightness and is kept in this state.

When the electric field applied to the liquid crystal layer of a nematic phase by the heat electrode 24 and the transparent electrode 26 is varied in the course of its cooling, the extent of scattering is varied, so that it is possible to impart gradation to a display. In this way, information can be written in a liquid crystal.

In this embodiment, the head electrode 24 formed from aluminum has a coefficient of thermal expansion of $23 \times 10^{-6}$ deg$^{-1}$, the glass substrate 22 formed from borosilicate glass has a coefficient of thermal expansion of $3.25 \times 10^{-6}$ deg$^{-1}$ at 0°-300° C., and the layer 25 for thermal stress relaxation has a coefficient of thermal expansion of $11 \times 10^{-6}$ deg$^{-1}$. The thermal stress which results from the difference between the coefficients of thermal expansion when the heat electrode is heated can be relaxed by arranging the layer 25 for thermal stress relaxation between the heat electrode 24 and the glass substrate 22, whereby the heat electrode 24 can be prevented from failing or peeling. Further, an effect of preventing the component of the glass substrate from being dissolved in the liquid crystal can also be expected.

In general, almost all of the organic polymers have coefficients of thermal expansion (coefficients of linear expansion) of $4 \times 10^{-5}$ deg$^{-1}$ or above in the temperature region below their glass transition temperatures, which are much greater than those of inorganic substances such as glass and metals. Generally, in a thermal writing type liquid crystal device, the heat electrode is made of metal and the substrates are made of glass, and therefore it is difficult to apply common organic polymers as materials having a coefficient of thermal expansion lying between the coefficient of thermal expansion of the heat electrode and that of the substrate. On the contrary, the polyimide of this embodiment can serve as a material for a layer for thermal relaxation which can be used suitably in this embodiment.

Polyimides which can be suitably used as materials for layers for thermal stress relaxation in this embodiment are those having a chemical structural unit of the general formula [I] or of the general formulas [I] and [III]. General formulas [I] and [III] are as follows:

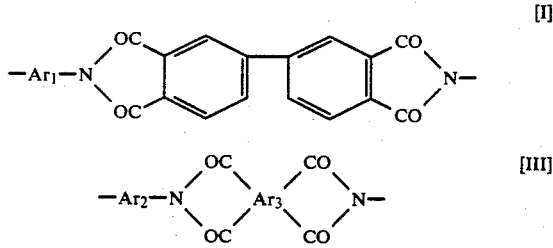

wherein Ar$_1$ is an aromatic group selected from the group consisting of

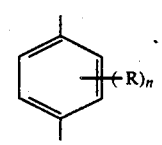

(wherein R is a lower alkyl group or a fluorine-containing lower alkyl group, and n is 0-4),

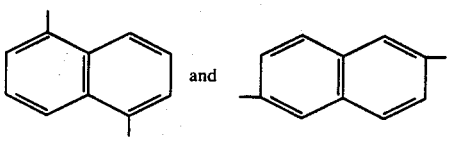 and

Ar₂ is a bivalent aromatic group, and Ar₃ is a tetravalent aromatic group.

More particularly, the polyimide which can be suitably used as a layer for thermal stress relaxation in this embodiment can be obtained by reacting p-phenylenediamine, 2,4-diaminotoluene, 2,4-diaminoxylene, diaminodurene, 1,5-diaminonaphthalene, 2,6-diaminonaphthalene, or a corresponding isocyanate with biphenyltetracarboxylic acid or its derivative. Among these diamines, p-phenylenediamine is the most excellent in respect of toughness, fatigue resistance, and heat resistance. Also p-phenylene diisocyanate is excellent. Examples of the tetracarboxylic acid derivatives includes esters, acid anhydrides, and acid chlorides. The use of an acid anhydride is desirable for the synthesis. The synthetic reaction is carried out at a temperature within the range of 0° to 200° C. in solution in a solvent such as N-methylpyrrolidone (NMP), dimethylformamide (DMF), dimethylacetamide (DMAC), dimethyl sulfoxide (DMSO), dimethyl sulfate, sulfolane, butyrolactone, cresol, phenol, halogenated phenols, cyclohexanone, or dioxane.

It is also possible to use, in addition to the above mentioned principal components, a polyimide obtained by modifying by introducing a different aromatic diamine, aromatic diisocyanate, or tetracarboxylic acid or its derivative in an amount within an acceptable range as the material for thermal stress relaxation of this embodiment.

Examples of these include diamines such as m-phenylenediamine, benzidine, 4,4'-diaminoterphenyl, 4,4'''-diaminoquaterphenyl, 4,4'-diaminodiphenylmethane, 1,2-bis(anilino)-ethane, 4,4'-diaminodiphenyl ether, diaminodiphenyl sulfone, 2,2-bis(p-aminophenyl)propane, 2,2-bis(p-aminophenyl)-hexafluoropropane, 3,3'-dimethylbenzidine, 3,3'-dimethoxybenzidine, 3,3'-dimethyl-4,4'-diaminodiphenyl ether, 3,3'-dimethyl-4,4'-diaminodiphenylmethane, diaminotoluene, diaminobenzotrifluoride, 1,4-bis(p-aminophenoxy)-benzene, 4,4'-bis(p-aminophenoxy)biphenyl, 2,2-bis{4-(p-aminophenoxy)-phenyl}propane, diaminoanthraquinone, 4,4'-bis(3-aminophenoxyphenyl)diphenyl sulfone, 1,3-bis(anilino)hexafluoropropane, 1,4-bis(anilino)octafluorobutane, 1,5-bis(anilino)decafluoropentane, 1,7-bis-(anilino)tetradecafluoroheptane, a diaminosiloxane represented by the general formula:

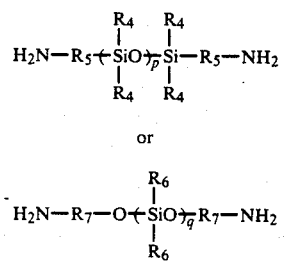

(wherein R₅ and R₇ are each a bivalent organic group, R₄ and R₆ are each a monovalent organic group, and p and q are each an integer greater than 1), 2,2-bis{4-(p-aminophenoxy)phenyl}hexafluoropropane, 2,2-bis{4-(3-aminophenoxy)phneyl}hexafluoropropane, 2,2-bis{4-(2-aminophenoxy)phenyl}-hexafluoropropane, 2,2-bis{4-(4-aminophenoxy)-3,5-dimethylphenyl}hexafluoropropane, 2,2-bis{4-(4-aminophenoxy)-3,5-ditrifluoromethylphenyl}hexafluoropropane, p-bis(4-amino-2-trifluoromethylphenoxy)benzene, 4,4'-bis(4-amino-2-trifluoromethylphenoxy)biphenyl, 4,4'-bis(4-amino-3-trifluoromethylphenoxy)biphenyl, 4,4'-bis(4-amino-2-trifluoromethylphenoxy)diphenyl sulfone, 4,4'bis(2-amino-5-trifluoromethylphenoxy)diphenyl sulfone, and 2,2-bis{4-(4-amino-3-trifluoromethylphenoxy)phenyl} hexafluoropropane; diisocyanates obtained by reacting these diamines with phosgene or the like, such as aromatic diisocyanates such as tolylene diisocyanate, diphenylmethane diisocyanate, naphthalene diisocyanate, diphenyl ether diisocyanate, and phenylene-1,3-diisocyanate. Examples of the tetracarboxylic acids and their derivatives include the following. Although these examples are given with reference to tetracarboxylic acids, their esters, anhydrides, and acid chlorides can, of course, be used. These examples are pyromellitic acid, 2,3,3',4'-tetracarboxydiphenyl, 3,3',4,4'-tetracarboxydiphenyl ether, 2,3,3',4'-tetracarboxydiphenyl ether, 3,3',4,4'-tetracarboxybenzophenone, 2,3,3',4'-tetracarboxybenzophenone, 2,3,6,7-tetracarboxynaphthalene, 1,4,5,7-tetracarboxynaphthalene, 1,2,5,6-tetracarboxynaphthalene, 3,3',4,4'-tetracarboxydiphenylmethane, 2,3-bis(3,4-dicarboxyphenyl)propane, 2,2-bis(3,4-dicarboxyphenyl)hexafluoropropane, 3,3',4,4'-tetracarboxydiphenyl sulfone, 3,4,9,10-tetracarboxyperylene, 2,2-bis{4-(3,4-dicarboxyphenoxy)phenyl}propane, 2,2-bis{4-(3,4-dicarboxyphenoxy)phenyl}hexafluoropropane, butanetetracarboxylic acid, and cyclopentanetetracarboxylic acid. It is also possible to introduce a crosslinked structure or a ladder structure by modification with a compound having a reactive functional group. For example, the following methods can be mentioned:

(i) A pyrrolone ring or an isoindoloquinazolinedione ring is introduced by modification with a compound represented by the general formula [V]:

wherein R' is a (2+n)-valent aromatic organic group, Z is a group selected from the group consisting of NH₂, CONH₂ and SO₂NH₂, and is ortho to the amino group.

(ii) A crosslinking structure is formed during curing by modification with an amine, diamine, dicarboxylic acid, tricarboxylic acid, or tetracarboxylic acid derivative having a polymerizable unsaturated bond. Examples of the unsaturated compounds which can be used include maleic acid, Nadic acid, tetrahydrophthalic acid, and ethynylaniline.

(iii) A network structure is formed by modification with an aromatic amine having a phenolic hydroxyl group or a carboxyl group and reaction with a crosslinking agent capable of reacting with the hydroxyl group or the carboxyl group.

Figure 4:
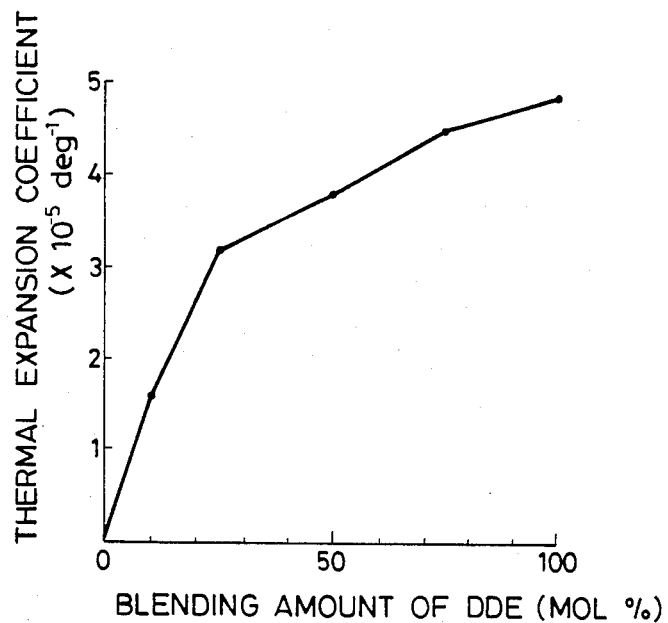
FIG. 4 is a graph showing the relationship between the coefficient of thermal expansion of the formed polyimide and the amount of diaminodiphenyl ether (DDE) added, obtained when a mixture of p-phenylenediamine (p-PDA) and DDE is reacted with biphenyltetracarboxylic acid anhydride.

The coefficient of thermal expansion can be controlled by modification with the above components. By increasing the content of a modifying component, a coefficient of thermal expansion which is greater than that of the polyimide consisting entirely of the structural unit represented by general formula [I] can be obtained, and this can be set at any desired value according to the purpose or use. For example, the polyimide consisting entirely of the structural unit represented by general formula [I] has a coefficient of thermal expansion of about $1\times 10^{-5}$ deg$^{-1}$, while when p-phenylenediamine (abbreviated as p-PDA) is used in combination with diaminodiphenyl ether (abbreviated as DDE), the formed polyimides have coefficients of thermal expansion as shown in FIG. 4. Here, the carboxylic acid component consists entirely of biphenyltetracarboxylic acid dianhydride, and this component is reacted with the fully aromatic diamine component is equimolar amounts. FIG. 4 shows that the rate of decrease in the coefficient of thermal expansion is considerably sharp when the amount of DDE added is 25 mol %.

When the material for the layer for thermal stress relaxation is used in the form of a composite with an inorganic material in this embodiment, adhesiveness to the material is important. It is preferred that the surface of the inorganic materials is roughened or treated with a silane coupling agent, titanate coupling agent, aluminum alcoholate, aluminum chelate, zirconium chelate, or aluminum acetylacetonate. It is also possible to add these surface treating agents to the material for the layer for thermal stress relaxation in this embodiment. In order to lower the coefficient of thermal expansion further, to increase the modulus of elasticity, to control the fluidity, or to reduce the cost, it is also possible to add inorganic substances, organic substances, or metals in the form of powders, fibers, or chopped strands.

Embodiment 2

Figure 5:
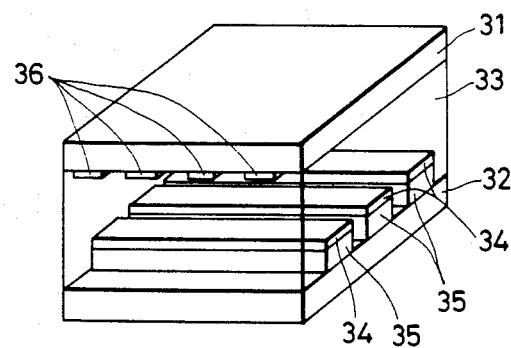
FIG. 5 is a drawing of the basic structure of the display panel of the liquid crystal device of Embodiment 2.

FIG. 5 is a perspective view of the basic structure of the display panel of a liquid crystal device of Embodiment 2 of the present invention.

A glass substrate 31 is provided with a transparent electrode 36. The material of the transparent electrode 36 is a mixture of indium oxide and tin oxide. A glass substrate 32 which serves as a support for both a liquid crystal and an electrode for generating heat is provided with a heat electrode 34 which is an electrode for generating heat necessary for writing. The material of the heat electrode 34 is aluminum.

The material for the glass substrates 31 and 32 in this embodiment is borosilicate glass, which has a composition of 81% of $SiO_2$, 12% of $B_2O_3$, 4% of $Na_2O$, and 3% of $Al_2O_3$.

In this embodiment, a material having a coefficient of thermal expansion lying between the coefficient of thermal expansion of the heat electrode 34 and that of the glass substrate 32 is arranged as a layer 35 for thermal stress relaxation between the heat electrode 34 and the glass substrate 32, for the purpose of preventing the heat electrode 34 from failing or peeling from the glass substrate for supporting the heat electrode 34 by thermal stress which, when the heat electrode 34 is heated, results from the difference between the coefficient of thermal expansion of the glass substrate 32 and that of the heat electrode 34. It is the feature of this embodiment that the layer for thermal stress relaxation is arranged so as to form a hexahedron of which the bottom coincides with the lower surface of the heat electrode 34. Although the material for the layer for thermal stress relaxation may be the same material as that used in Embodiment 1, other materials may be used as long as they have a coefficient of thermal expansion lying between the coefficient of thermal expansion of the heat electrode 34 and that of the glass substrate 32. According to the above structure, thermal stress which, when the heat electrode 34 generates heat, results from the difference between the coefficient of thermal expansion of the heat electrode 34 and that of the glass substrate 32 can be relaxed, and the heat electrode 34 can be prevented from failing or peeling. Further, in this case, an effect of reducing the amount of the material for the layer for thermal stress relaxation can be expected.

While the embodiments of the present invention have been described with reference to Embodiments 1 and 2, the materials for the heat electrode which is an electrode for generating heat may be chromium, aluminum-silicon, nickel, etc., as well as aluminum.

Further, although single materials are used as the materials for the layers for thermal stress relaxation in Embodiments 1 and 2, it is also possible to use a laminate of a plurality of materials. In this case, it becomes possible to prevent more securely the heat electrode from being degraded by failure or peeling by laminating the materials in such a manner that the material having a coefficient of thermal expansion which is the closest to that of the substrate is placed on the substrate, other materials are laminated in a like manner, the material having a coefficient of thermal expansion which is the closest to that of the heat electrode is placed last, and the heat electrode is formed on the last material. It is also possible to use a layer for thermal stress relaxation as a reflective film by adding a white material, for example, aluminum to the material for the layer for thermal stress relaxation, in such an amount that the electrical insulating property of the layer for thermal stress relaxation can be retained.

Although borosilicate glass was used as the substrates in Embodiments 1 and 2, it is possible to use other glasses, for example, soda lime glass which is vapor-deposited with silicon dioxide or the like to prevent sodium, etc., from dissolving in the surroundings or quartz glass. In addition to the glass, it is also possible to use any materials that have heat resistance and insulating property suitable for the present invention, such as ceramics or plastics.

According to the present invention, it is possible to relax a thermal stress resulting between an electrode for generating heat and a substrate, and therefore the electrode can be prevented from being degraded by failure or peeling, and elongation of the service life of the liquid crystal device can be achieved.

We claim:

1. A liquid crystal device comprising a thermal writing type liquid crystal, an electrode for generating heat necessary for said thermal writing, and a support for supporting said crystal and said electrode, and an insulating layer having a coefficient of thermal expansion lying between the coefficient of thermal expansion of said electrode and that of said support, arranged between said electrode and said support, wherein said insulating layer comprises a polyimide having a chemical structural unit represented by the following formula [I]:

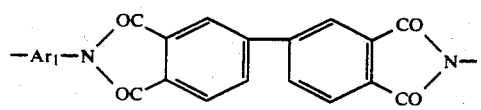 [I]

wherein $Ar_1$ is an aromatic group selected from the group consisting of

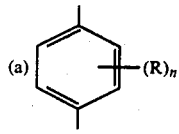 (a)

(wherein R is a lower alkyl group or a fluorine-containing lower alkyl group, and n is 0 to 4),

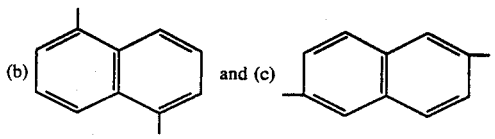 (b) and (c)

2. A liquid crystal device in accordance with claim 1, wherein said insulating layer additionally contains a polyimide having a chemical structural unit represented by the following formula [III]:

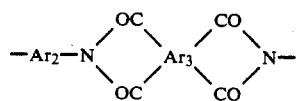 [III]

wherein $Ar_2$ is a bivalent aromatic group and $Ar_3$ is a tetravalent aromatic group.

3. A liquid crystal device in accordance with claim 1, wherein said insulating layer is a laminate.

4. A liquid crystal device in accordance with claim 1, wherein said insulating layer additionally contains a white material for reflecting light.

5. A liquid crystal device comprising a thermal writing type liquid crystal, an electrode for generating heat necessary for said thermal writing, and a support for supporting said crystal and said electrode, and an insulating layer having a coefficient of thermal expansion lying between the coefficient of thermal expansion of said electrode and that of said support, arranged between said electrode and said support, wherein said insulating layer comprises a polyimide having a chemical structural unit represented by the following formula [II]:

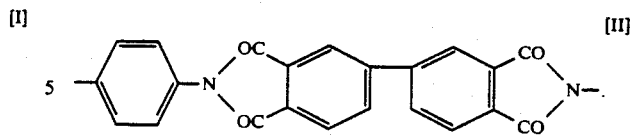 [II]

6. A liquid crystal device in accordance with claim 5, wherein said insulating layer is a laminate.

7. A liquid crystal device in accordance with claim 5, wherein said insulating layer additionally contains a white material for reflecting light.

8. A liquid crystal device comprising a thermal writing type liquid crystal, a heat electrode for generating heat necessary for said thermal writing, and a support for supporting said crystal and said heat electrode, said device further comprising an insulating layer having a coefficient of thermal expansion lying between the coefficient of thermal expansion of said heat electrode and that of said support, arranged between the heat electrode and support, the coefficient of thermal expansion of said insulating layer, relative to that of the support and heat electrode, being such that heat electrode failure or peeling from the support due to thermal stress resulting from the difference between the coefficient of thermal expansion of the heat electrode and the support is avoided.

9. A liquid crystal device in accordance with claim 8, wherein the insulating layer comprises an organic polymer.

10. A liquid crystal device in accordance with claim 9, wherein the insulating layer comprises a composite of an inorganic material and said organic polymer.

11. A liquid crystal device in accordance with claim 9, wherein the insulating layer comprises powders, fibers or chopped strands incorporated in a layer of the organic polymer.

12. A liquid crystal device in accordance with claim 8, wherein said insulating layer is arranged so as to form a hexahedron of which the bottom coincides with the surface of the heat electrode closest to the substrate.

13. A liquid crystal device in accordance with claim 8, wherein said insulating layer is a laminate of a plurality of layers of different materials.

14. A liquid crystal device in accordance with claim 13, wherein the layers of different materials have different coefficients of thermal expansion, with the layer of material having a coefficient of thermal expansion closest to that of the support being located nearest the support, and the layer of material having a coefficient of thermal expansion closest to that of the heat electrode being located nearest to the heat electrode.

15. A liquid crystal device in accordance with claim 8, wherein said insulating layer additionally contains a white material for reflecting light.

* * * * *